Oct. 14, 1958   W. H. PHELPS   2,855,745
CLIPPINGS BASKET FOR ROTARY MOWER
Filed Feb. 29, 1956   2 Sheets-Sheet 2
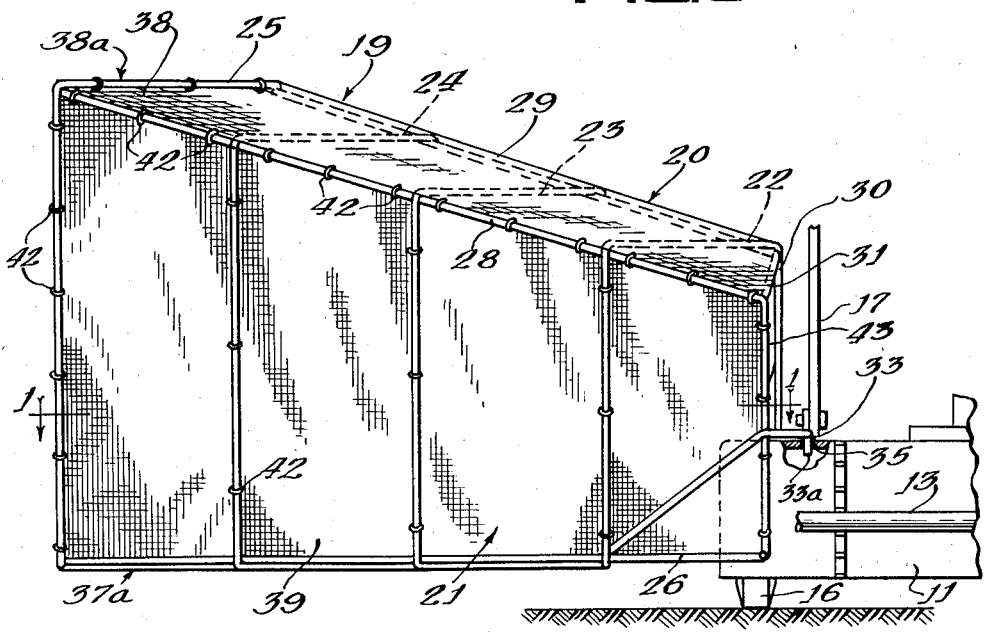
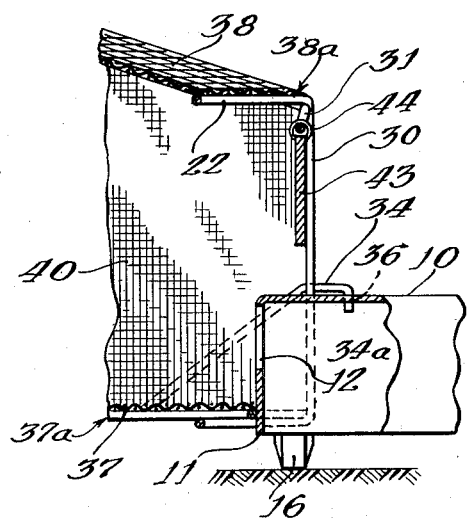
Inventor:
William H. Phelps
By: Schroeder, Hofgren,
Brady & Wegner
Attorneys

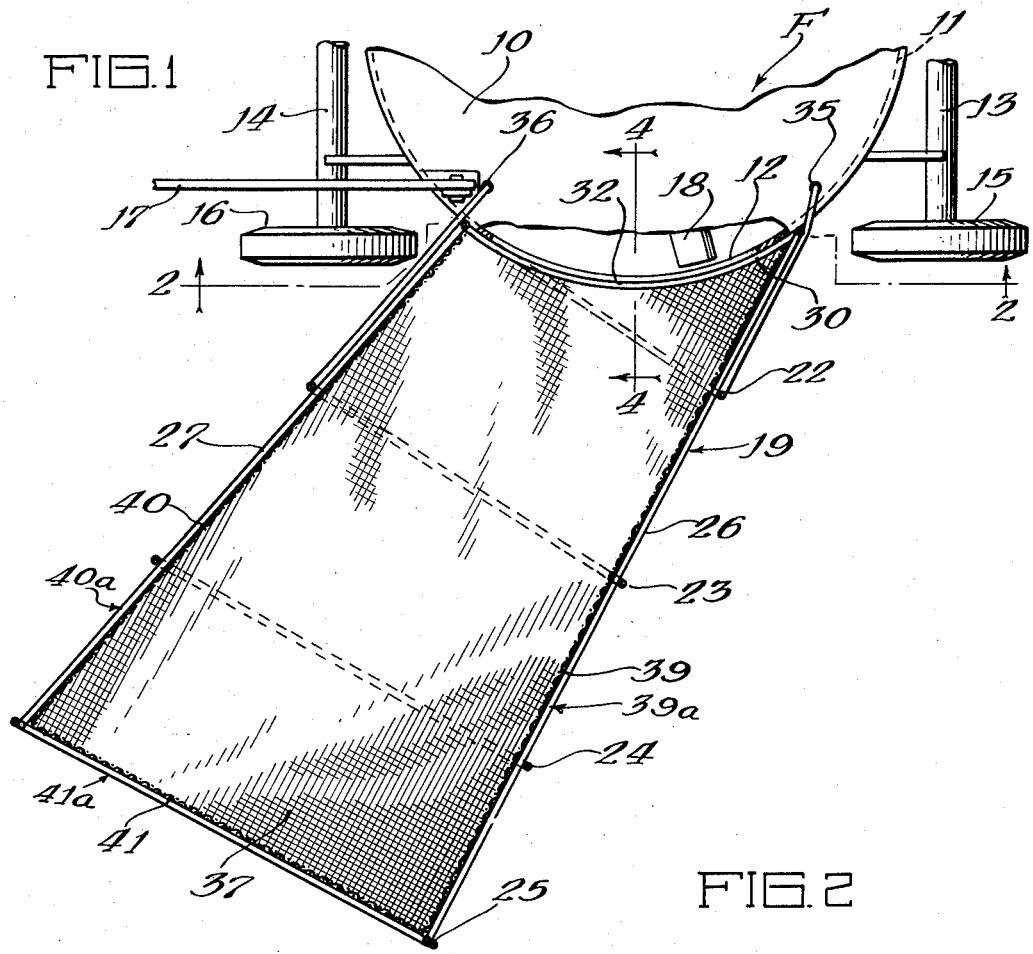

United States Patent Office 2,855,745
Patented Oct. 14, 1958

2,855,745

CLIPPINGS BASKET FOR ROTARY MOWER

William H. Phelps, Ralston, Nebr.

Application February 29, 1956, Serial No. 568,464

2 Claims. (Cl. 56—202)

This invention relates to an improved clippings basket for a rotary mower; and in particular it rates to a basket which hangs on the mower frame and has a foraminous basket body to receive clippings from a discharge opening in the mower casing.

This invention is directed particularly to a basket which may be attached to the mower disclosed in applicant's patent 2,726,503 issued December 13, 1955.

The principal object of the invention is to provide a basket which is so constructed that it loads with clippings progressively from the rear to the front, and is adapted to be easily emptied through the open front.

A further object of the invention is to provide a basket which may be easily attached or detached from the mower frame without the use of any removable fastening members.

Yet another object of the invention is to provide a basket of quadrilateral cross section which is of increasing cross sectional area from an open inner end to a closed outer end, and in which the opening at the inner end of the basket is partially closed in use by a pivoted baffle which may swing out of the way for easy emptying of the basket.

The invention is shown in a preferred embodiment in the accompanying drawings, in which:

Fig. 1 is a sectional view of the basket taken substantially as indicated along the line 1—1 of Fig. 3, the mower on which the basket is mounted being fragmentarily shown partially in section;

Fig. 2 is a section taken as indicated along the line 2—2 of Fig. 1;

Fig. 3 is a front elevational view of the basket, the mower being shown fragmentarily and partially in section with the front wheel broken away for clarity of illustration; and Fig. 4 is a fragmentary section on an enlarged scale taken as indicated along the line 4—4 of Fig. 1.

Referring to the drawings in greater detail, a mower has a frame F which includes a circular solid top plate 10 and a depending guard skirt 11 which has a rectangular opening 12 in one side. The mower has front and rear axles 13 and 14 which support, respectively, front wheels 15 and rear wheels 16; and a handle 17 extends in an inclined manner rearwardly from the frame. A cutter blade 18 (Fig. 1) is mounted on a vertical shaft (not shown) for rotation by an electric or gasoline motor in the usual fashion.

The clippings basket of the present invention is designated generally by the numeral 19, and consists of a basket frame indicated at 20 and a basket body of foraminous material, indicated generally at 21. As best seen in Figs. 1 and 3, the basket frame 20 consists of four quadrilateral upright frame members 22, 23, 24 and 25 which are of progressively increasing breadth and height from the inner frame member 22 to the outer frame member 25; and said quadrilateral frame members are connected by a pair of longitudinal bottom frame elements 26 and 27 and a pair of upper longitudinal frame elements 28 and 29; each of said longitudinal elements being secured to a corner of each quadrilateral frame member. The bottoms of the quadrilateral frame members are generally coplanar, so that all the height increase is upward. As best seen in Figs. 1 and 3, a modified quadrilateral front frame 30 is secured at one side to the innermost rectangular frame 22 and has a straight top crossbar 31 combined with an arcuate bottom crossbar 32 which has a radius of curvatures substantially equal to that of the skirt 11 so that it fits smoothly against the lower portion of the guard skirt 11 below the rectangular opening 12.

The quadrilateral frame members, in combination with the longitudinal frame elements, form a basket frame having a bottom 37a, an inclined uniplanar top 38a, outwardly diverging uniplanar sides 39a and 40a, a rectangular back 41a and a modified quadrilateral front formed by the frame member 30.

As best seen in Figs. 3 and 4, the basket has a pair of hanger hooks 33 and 34 which extend inwardly from the modified quadrilateral front frame member 31 and which are provided with downturned ends 33a and 34a, respectively, to engage in suitable holes 35 and 36 in the top plate 10 of the mower frame. Thus, as best seen in Figs. 3 and 4, the clippings basket 19 is mounted on the mower frame by hooking the mounting arms 33 and 34 into the holes 35 and 36 and permitting the arcuate bottom bar 32 of the modified quadrilateral inner frame to rest against the skirt 11. Thus the basket frame 20 may hang on the mower frame F in a generally horizontal position as shown in the drawings; or by bending the mounting arms 33 and 34 the basket may be slightly inclined.

The basket body 21 consists of five foraminous body panels, including a bottom panel 37, a top panel 38, side panels 39 and 40 and a back panel 41. Conveniently each of the panels is provided with a fabric edge strip so that it may be secured to the adjacent frame members by lashings such as the lashings 42 seen in Fig. 3.

The present clippings basket is similar in principle to that disclosed and claimed in applicant's copending application Serial No. 420,855 filed April 5, 1954. An important feature of the basket is the fact that it is of increasing cross section from front to rear. It has been found that one very important factor in proper filling of the clippings basket during use of the mower is that there be only a small space between the mower frame and the top of the inner end of the basket. This requires that the opening at the inner end of the basket be of relatively small area, and causes a problem when the basket is to be emptied because the clippings can form a fairly solid mass at the narrow open end. The problem of emptying the basket is solved in the present construction by providing the device with an inner open end which is substantially higher than the mower frame as seen in Figs. 2 and 4, and hanging a pivoted baffle plate 43 from the innermost quadrilateral frame crossbar 31 by means of mounting rings 44. The pivoted baffle 43 fills most of space between the top of the basket frame 20 and the top plate 10 of the mower frame, so as to prevent turbulence in the front of the basket from throwing clippings back onto the mower frame. When it is desired to empty the basket, however, the baffle 43 is swung out of the way by the weight of clipps so as to permit free flow of clippings from the basket.

The foregoing detailed description is given for clearness of understanding only and no unnecessary limitations are to be understood therefrom, as some modifications will be obvious to those skilled in the art.

I claim:

1. A clippings basket for use with a rotary power mower of the pressure discharge type, said basket comprising: a basket frame of generally rectangular cross section, said frame having substantially uniplanar, outwardly diverging sides, a generally horizontal flat bottom, and a uniplanar top which is inclined upwardly and outwardly, said sides, top and bottom defining inner and outer ends of said frame; a foraminous basket body enclosing all but the inner end of the frame; a pivoted baffle hung from the top of the inner end of the basket frame, said baffle having an operating position extending across the upper portion of said inner end and swinging clear of said opening when the basket is being emptied through said open end.

2. A clippings basket for use with a rotary type power mower having an annular skirt provided with a lateral discharge opening, said basket comprising: a rigid basket frame including a four-sided inner frame member having upright side bars the upper ends of which are connected by a straight cross bar and the lower ends of which are connected by a concave cross bar the radius of curvature of which is substantially equal to that of said skirt, a rectangular outer frame member both the height and the width of which are greater than those of the inner frame member, and straight lower and upper longitudinal frame members connecting the corresponding corners of said inner and outer frame members, said lower frame members being substantially prependicular to the bottom of the outer frame member and the lower and upper longitudinal frame members on one side being substantially perpendicular to the plane of the outer frame members, a foraminous basket body enclosing all but the inner end of the frame; a pivoted baffle suspended from the straight cross bar of the inner frame member, said baffle having an operating position extending across the upper portion of the inner end of the frame and swinging clear of said inner end when the basket is being emptied through said end; and attaching means on the basket frame for detachably supporting said basket.

References Cited in the file of this patent

UNITED STATES PATENTS

| | | |
|---|---|---|
| 2,641,100 | Sylvester | June 9, 1953 |
| 2,747,356 | Peterson | May 29, 1956 |
| 2,783,604 | Cahill | Mar. 5, 1957 |

FOREIGN PATENTS

| | | |
|---|---|---|
| 385,473 | Great Britain | Dec. 29, 1932 |